Aug. 22, 1933.  W. OLSON  1,924,075

COVERING DEVICE FOR PLANTERS

Filed Oct. 5, 1932

Inventor
William Olson
By [signature]
Atty.

Patented Aug. 22, 1933

1,924,075

UNITED STATES PATENT OFFICE 1,924,075

COVERING DEVICE FOR PLANTERS

William Olson, Hines, Minn., assignor to International Harvester Company, a Corporation of New Jersey Application October 5, 1932. Serial No. 636,277

4 Claims. (Cl. 111—85)

My invention relates to furrow covering devices for planters, and more particularly to a furrow covering attachment for grain drills.

Grain drills are as a rule provided with furrow covering drags, one of which is connected to trail loosely from each of the seed depositing units of the drill. It has heretofore been the practice to connect such drags to the units by means of a rigid link coupling, and, as the drags on the outer units of a drill are often caught under a wheel of the drill when a short turn is made, a strain is imposed on the drag, which causes the coupling to be broken and the drag on the unit or units next to the supporting wheel to be torn off or damaged. The purpose of my invention is to provide a coupling for the drags on the outer units of the drill next to the supporting wheels, so constructed as to stretch or yield, should the same become engaged under the wheel, thereby preventing the loss and breakage heretofore occurring.

The invention accordingly comprises the novel construction and combination of parts hereinafter more particularly described and illustrated in the accompanying drawing, where:

Figure 1:
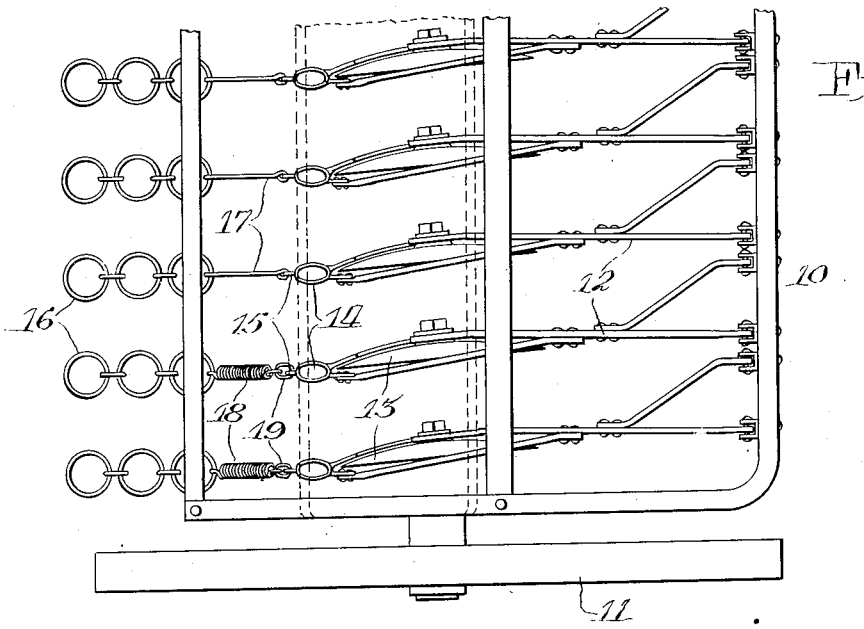
Figure 1 is a plan view of a portion of a grain drill showing the novel coupling on certain of the drill units.
Figure 2:
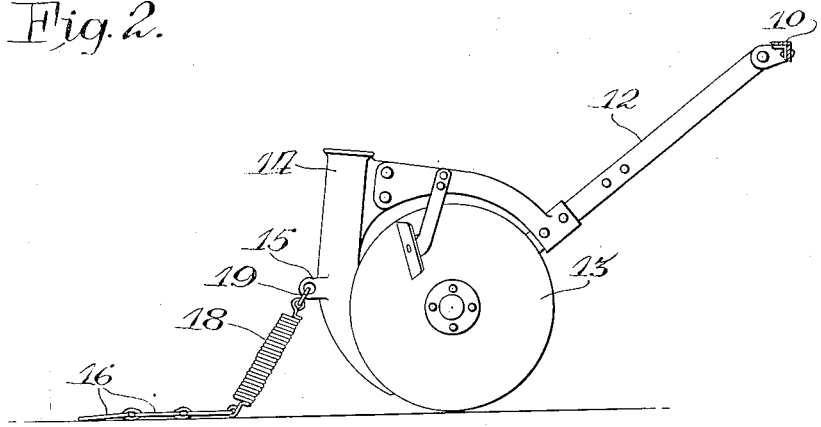
Figure 2 is a side elevation of a grain drill unit having the novel drag coupling connected thereto; and, Figure 3 is a perspective view showing how the end drag of a drill may become engaged under the drill wheel during a short turn of the drill.

The invention is illustrated as applied to a grain drill of conventional construction and comprising a main frame 10, supporting wheels 11, and the dragbars and planting units 12. The planting units are illustrated as comprising a disk furrow opener 13 and the seed depositing boot 14. The rear surface of each boot is provided with a lug 15 having an opening for reception of the connecting element for the furrow covering drag. For purposes of illustration, these drags are here shown as chains 16 composed of a series of flexibly connected circles or links, which engage the soil and cover the seed containing furrow formed by the unit. It has heretofore been the practice to connect such chains to each unit by a rod-like link, as at 17 in Figure 1. In the practice of my invention, I substitute for the rigid rod-like link 17 a longitudinally yieldable coupling or coil spring 18, which is loosely connected to the first link of the drag chain 16 at one end and to the lug 15 on the boot at the other end. Preferably this yieldable coupling or spring 18 is connected to the lug by a short, intermediate link 19, in order to provide loose swiveling and pivotal movement at that point.

Figure 3:
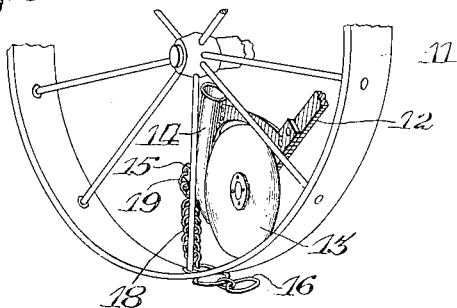

With the construction above described the drag chain 16 is yieldably coupled to the boot. When a short turn of the drill is made, as at the end of a field, one of the wheels will be backed and sideward trailing movement of the drag chains occurs, bringing the same under the wheel, as shown in Figure 3. When this occurs, the yielding of the coupling spring 18 will prevent any breakage and allow the drag chain to return to its normal position when forward travel is resumed. In practice, it will only be necessary to use the novel coupling on the one or two outer units of the drill, as these are the only drag chains likely to become caught under the wheels of the drill.

My invention accordingly provides a simple and efficient form of furrow covering drag for planters, which prevents the loss and breakage heretofore suffered when such devices were subjected to unusual strain, either through being caught under a grain drill wheel, as above described, or when caught on some obstruction in the soil.

The preferred construction illustrated and described herein is, of course, subject to modification without departure from the scope of the invention as defined in the following claims.

What is claimed as new is:

1. In a wheel supported grain drill, the combination with furrow opening units located adjacent the supporting wheels thereof, of a loosely dragging furrow covering drag chain, and coupling means between said unit and drag chain comprising a longitudinally yieldable spring having a freely movable connection with the unit.

2. A covering attachment for seed planting units comprising an extension spring adapted to be connected to the unit, and furrow covering drag chain loosely connected to said spring.

3. A covering attachment for seed planting units comprising a soil engaging drag chain, a coil spring flexibly connected to one end thereof, and a link on the other end of said spring for attaching it to a planting unit.

4. In a wheel supported grain drill having furrow opening units, the combination with the furrow opening unit adjacent a supporting wheel of the drill of an elongated furrow covering drag loosely connected to said unit and composed of a plurality of loosely connected sections one of which is resilient and yieldable when the drag is caught under said wheel.

WILLIAM OLSON.